US012798694B2

(12) United States Patent
Fuentes et al.

(10) Patent No.: US 12,798,694 B2
(45) Date of Patent: Nov. 17, 2026

(54) VEHICLE CARGO EXTENDING APPARATUS

(71) Applicant: NISSAN NORTH AMERICA, INC., Franklin, TN (US)

(72) Inventors: Bobby Fuentes, Novi, MI (US); Aaron Felsenfeld, Sylvan Lake, MI (US); Christian A. Herrington, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 262 days.

(21) Appl. No.: 18/643,491

(22) Filed: Apr. 23, 2024

(65) Prior Publication Data

US 2025/0326446 A1 Oct. 23, 2025

(51) Int. Cl.

*B62D 33/027* (2006.01)
*B60J 5/10* (2006.01)
*B60P 3/42* (2006.01)
*B62D 33/06* (2006.01)
*B62D 33/08* (2006.01)
*B62D 47/00* (2006.01)

(52) U.S. Cl.

CPC ............. *B62D 33/08* (2013.01); *B62D 33/06* (2013.01); *B60J 5/108* (2013.01); *B60P 3/423* (2013.01); *B62D 33/0273* (2013.01); *B62D 47/003* (2013.01)

(58) Field of Classification Search

CPC .... B62D 33/02; B62D 33/023; B62D 33/027; B62D 33/0276; B62D 33/03; B62D 33/06; B62D 33/08; B62D 47/003; B60J 5/06; B60J 5/067; B60J 5/08; B60J 5/10; B60J 5/102; B60J 5/108; B60J 5/12; B60J 5/14; E06B 2009/689; B60P 3/423; B60R 21/026

USPC ....................................... 296/50, 57.1, 26.08

See application file for complete search history.

(56) References Cited

U.S. PATENT DOCUMENTS 4,480,868 A * 11/1984 Koto .................... B60N 2/3095 297/335
6,276,744 B1 * 8/2001 Huber ................... E05F 15/686 160/181
6,520,562 B2 * 2/2003 Pyo ...................... B62D 47/003 296/147
6,742,834 B1 * 6/2004 Merritt ................. B60N 2/3011 296/26.11

(Continued)

FOREIGN PATENT DOCUMENTS

WO WO-2010076820 A1 * 7/2010 ............. E06B 9/322

OTHER PUBLICATIONS

General Motors LLC, Chevrolet, Silverado EV Owner's Manual 2024, Feb. 2024, pp. 1, 8 and 24-29, USA.

*Primary Examiner* — Gregory A Blankenship
(74) *Attorney, Agent, or Firm* — Spencer Fane, LLP

(57) ABSTRACT

A vehicle body structure includes a vehicle cargo extending apparatus having at least one movable panel. The vehicle body structure has a passenger compartment and a cargo area. A rear wall of the passenger compartment defines an opening adjacent to the cargo area. The at least one panel is movable between a closed position covering the opening and an open position exposing the opening such that the at least one panel is located beneath a floor of the cargo area when in the open position.

20 Claims, 10 Drawing Sheets

(56) References Cited

U.S. PATENT DOCUMENTS

| | | | | |
|---|---|---|---|---|
| 7,607,709 | B1 * | 10/2009 | Bryant | B60P 3/423 296/190.08 |
| 7,762,621 | B2 * | 7/2010 | Duller | B60N 2/3011 296/190.11 |
| 2004/0217614 | A1 * | 11/2004 | Schlecht | B60R 21/026 296/24.4 |
| 2019/0047479 | A1 * | 2/2019 | Faruque | B60R 7/08 |
| 2021/0214987 | A1 * | 7/2021 | Thouin | E05D 15/165 |
| 2022/0266915 | A1 * | 8/2022 | Salter | B60J 5/108 |
| 2022/0388380 | A1 * | 12/2022 | Hoofard | E05F 15/686 |
| 2023/0192201 | A1 * | 6/2023 | Smith | B62D 33/08 296/193.05 |
| 2023/0356574 | A1 * | 11/2023 | Morrow, Jr. | B60J 5/103 |
| 2023/0373429 | A1 * | 11/2023 | Jaradi | B60R 21/01 |
| 2024/0116582 | A1 * | 4/2024 | de Salvi | B62D 33/08 |
| 2025/0326446 | A1 * | 10/2025 | Fuentes | B62D 33/08 |

* cited by examiner

VEHICLE CARGO EXTENDING APPARATUS

BACKGROUND

Technical Field

The present disclosure generally relates to a vehicle cargo extending apparatus. More specifically, the present disclosure relates to a vehicle cargo extending apparatus that extends a pickup truck's cargo area into the passenger compartment of the vehicle.

Background Information

Pick-up trucks are well known for their usefulness in moving cargo such as lumber, furniture and other commercial and personal items. In the event that the cargo is longer than the cargo bed or floor of the cargo area, a vehicle operator typically must lower the tailgate of the pickup truck and allow the cargo to extend over the lowered tailgate and possibly beyond.

SUMMARY

One object of the present disclosure is to provide a unibody pickup truck with a cargo area extending apparatus that provides access to a rearward portion of a pickup truck passenger compartment for use as an extended area of the cargo area of the pickup truck.

In view of the state of the known technology, one aspect of the present disclosure is to provide a vehicle cargo extending apparatus with a vehicle body structure and at least one movable panel. The vehicle body structure has a passenger compartment and a cargo area. A rear wall of the passenger compartment defining an opening adjacent to the cargo area. The at least one panel is movable between a closed position covering the opening and an open position exposing the opening such that the at least one panel is located beneath a floor of the cargo area when in the open position.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
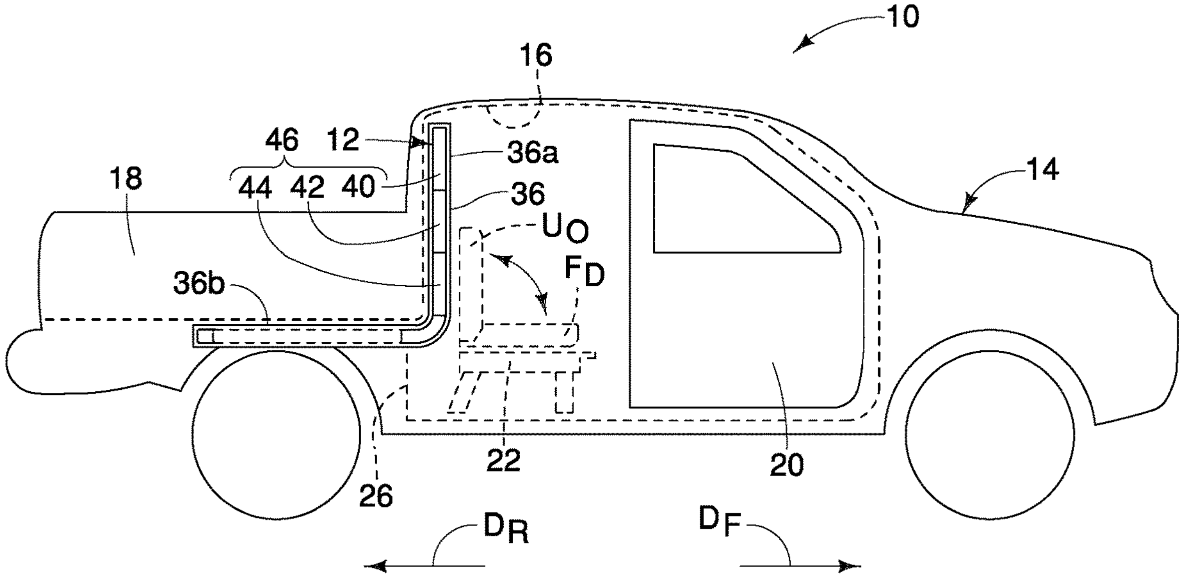
FIG. 1 is a schematic side view of a unibody vehicle (a pickup truck) having a passenger compartment and a cargo area showing a track and a movable door that moves along a pair of parallel tracks between a closed orientation shown in FIG. 1 and an open orientation (FIG. 3) in accordance with a first embodiment.
Figure 2:
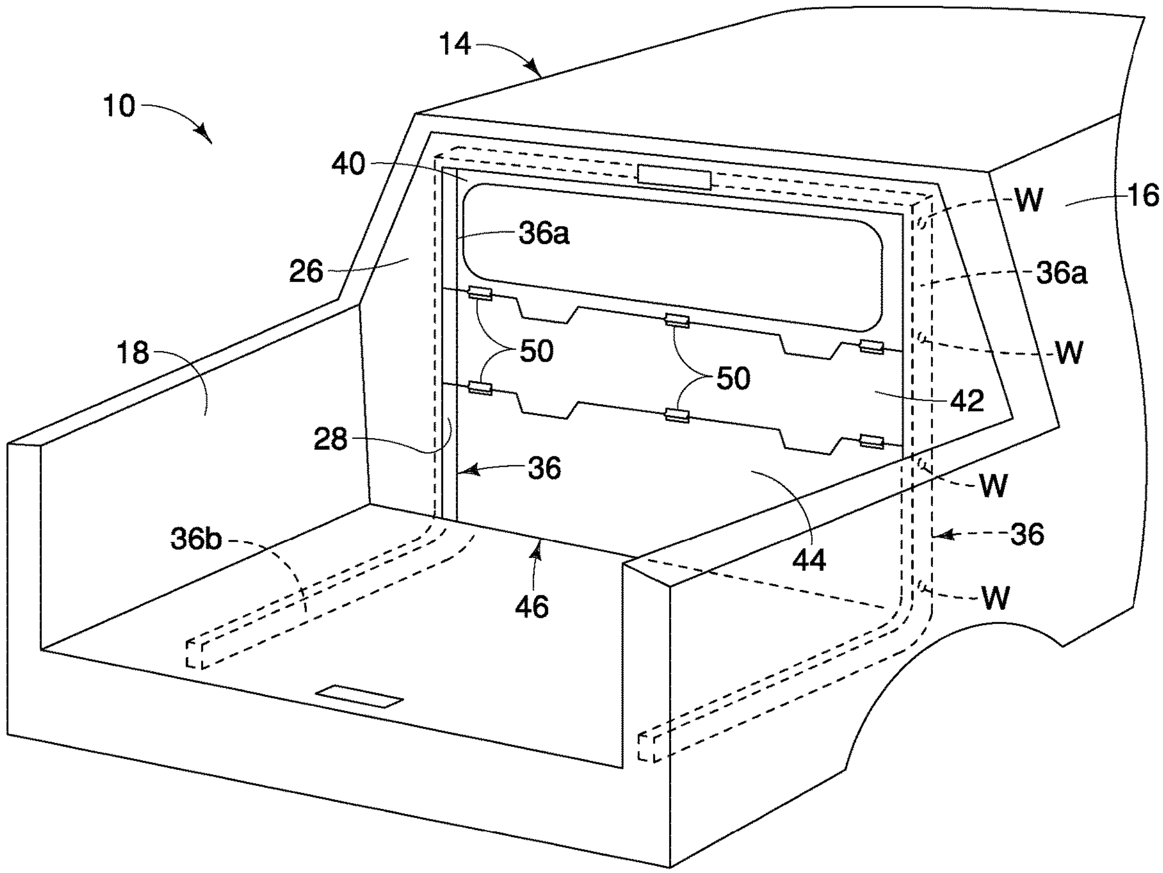
FIG. 2 is a schematic rear perspective view of the unibody vehicle showing the door in the closed orientation covering an opening in a rear wall of the passenger compartment and showing the parallel tracks extending along the opening in the rear wall and curving downward beneath a floor of the cargo area in accordance with the first embodiment.

Referring initially to FIGS. 1 and 2, a vehicle 10 having a vehicle cargo extending apparatus 12 is illustrated in accordance with a first embodiment.

The vehicle 10 has a vehicle body structure 14 that defines a passenger compartment 16 and a cargo area 18.

There are two main types of chassis: body-on-frame and unibody. The body-on-frame chassis consists of separate components, with a frame providing the structural support and a body mounted on top. On the other hand, a unibody chassis integrates the body and chassis into a single unit. Unibody chassis designs are common in modern vehicles, offering improved handling and fuel efficiency.

The vehicle body structure 14 is preferably a pickup truck having a unibody chassis where the structure surrounding the passenger compartment and the structure defining the cargo area 18 are rigidly connected to one another in the absence of a separate frame.

The passenger compartment 16 includes at least front doors 20 (only one front door 20 is shown) that are moveable between respective closed positions (FIG. 1) and an open positions (not shown). The passenger compartment 16 has conventional front seats (not shown) and rear seats 22. The rear seats 22 are movable between a folded down $F_D$ orientation and an upright orientation $U_O$.

The passenger compartment 16 also has a rear wall 26 that defines an opening 28 that extends in a vertical direction from an area behind lower portions of the rear seat 22 to an area adjacent to a roof of the passenger compartment 16 adjacent to the cargo area 18.

Figure 4:
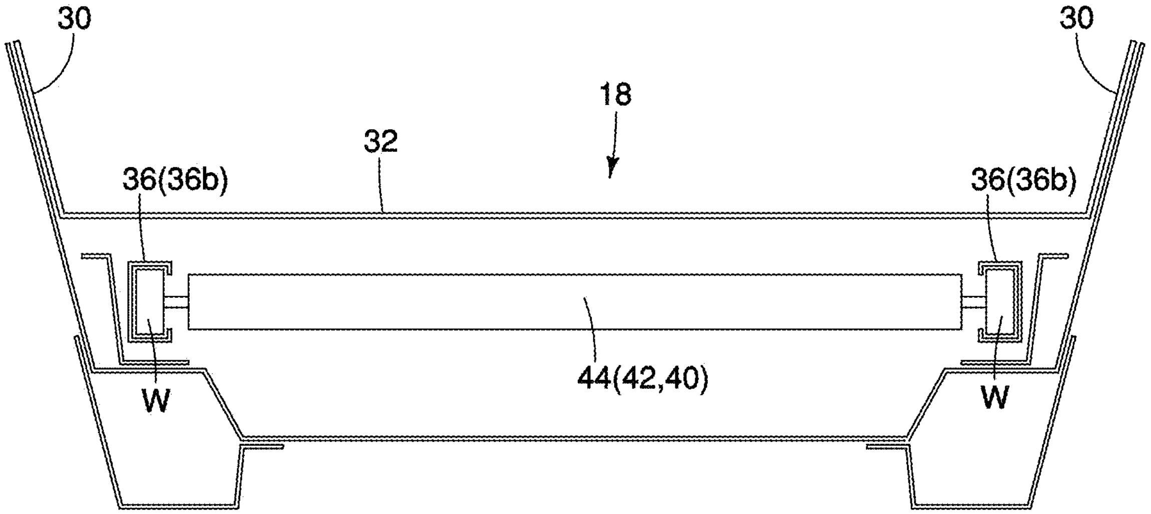
FIG. 4 is a schematic rear cross-sectional view of the unibody vehicle showing the door in the open orientation and being stowed beneath a floor of the cargo area in accordance with the first embodiment.

The cargo area 18 includes a pair of side walls 30 and a cargo floor 32 that extends between the side walls 30. The side walls 30 can be parallel to one another or alternatively, can be arranged to that they diverge away from one another in a vehicle forward direction $D_F$ or diverge away from one another in a vehicle rearward direction $D_R$. Further, the side walls 30 can have lower ends that are parallel to one another. However, in the depicted embodiment, the side walls 30 are inclined such that they diverge away from one another as they extend upward away from the cargo floor 32, as shown in FIG. 4.

Figure 3:
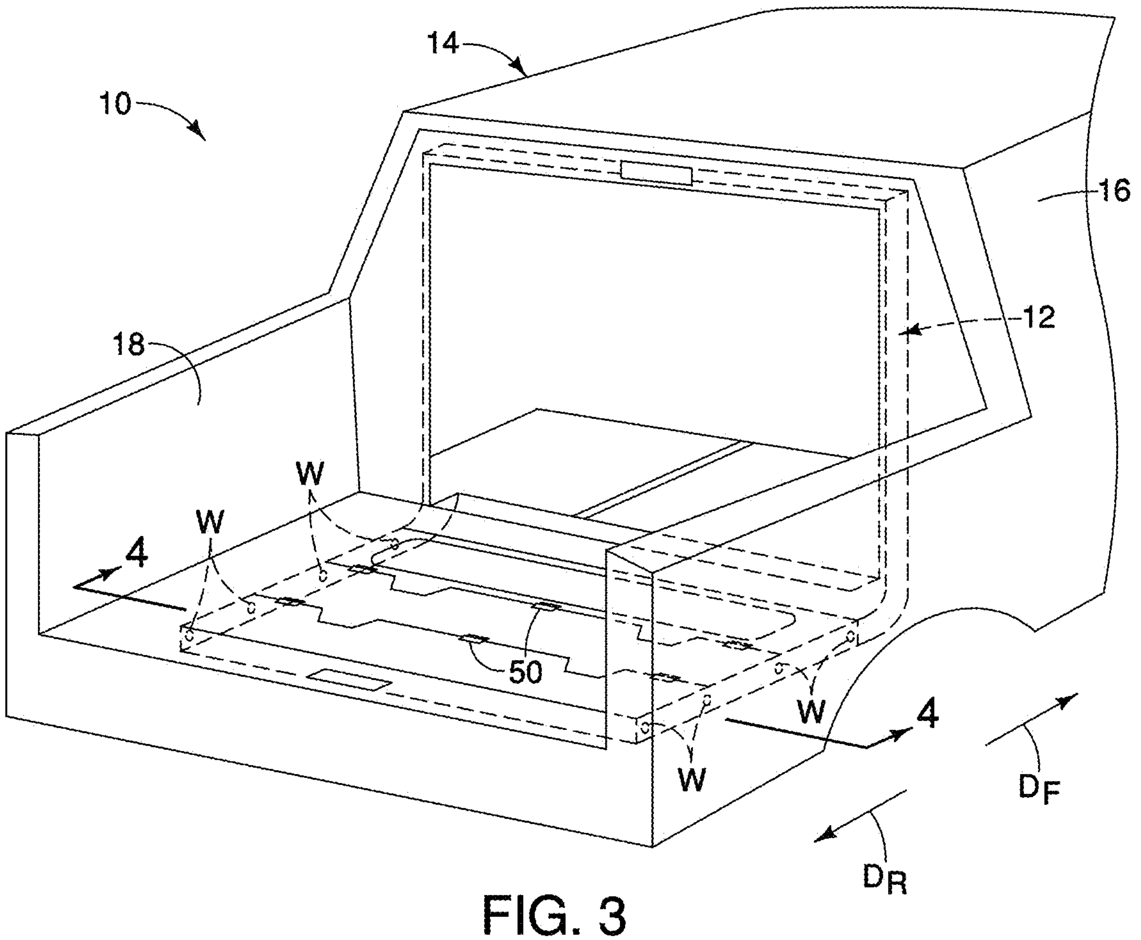
FIG. 3 is another schematic rear perspective view of the unibody vehicle similar to FIG. 2, showing the door in the open orientation exposing the opening in a rear wall of the passenger compartment and showing the door retained in the parallel tracks beneath the floor of the cargo area in accordance with the first embodiment.

The vehicle cargo extending apparatus 12 (herein after the apparatus 12) includes a pair of tracks 36 that are parallel to one another and have an overall L-shape when viewed from the side, as shown in FIGS. 1-3. Upright portions **36*a* of the pair of tracks 36 extend along opposite sides of the opening 28 in the rear wall 26 of the passenger compartment 16. Horizontal portions 36*b* of the pair of tracks 36 extend rearward beneath the cargo floor 32**.

As shown in FIG. 2, the apparatus 12 further includes at least one panel 40 movable between a closed position covering the opening 28 and an open position exposing the opening 28 such that the at least one panel 40 is located beneath the cargo floor 32 of the cargo area 18 when in the open position. In the first embodiment, the at least one panel 40 includes a plurality of panels. Specifically, in the first embodiment the apparatus 12 includes the at least one panel 40 (hereinafter referred to as the first panel 40), a second panel 42 and a third panel 44.

The first, second and third panels 40, 42 and 44 are connected to one another by hinges 50 such that the first panel 40 is connected to the second panel 42 and can pivot relative to the second panel 42 about a pivot axis (not shown) defined by the hinges 50. Similarly, the second panel 42 is connected to the third panel 44 and can pivot relative to the third panel 44 about another pivot axis (not shown) defined by a further set of the hinges 50. In the first embodiment, the first panel 40 can optionally include a window 52.

Figure 8:
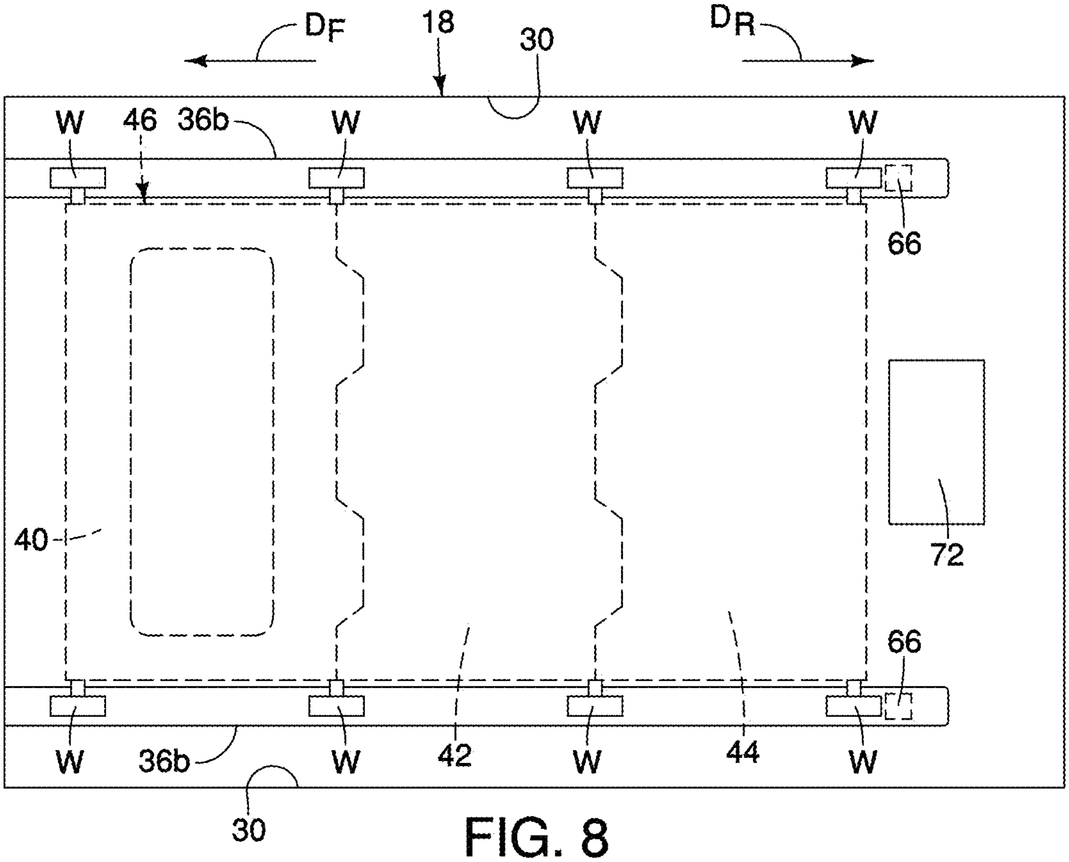
FIG. 8 is a top schematic view of the tracks and the door showing the top, middle and lower panels of the door moved to the horizontal portion of the tracks as the door has completed movement from the closed orientation to the open orientation in accordance with the first embodiment.

As shown in FIG. 4, all together the first, second and third panels 40, 42 and 44 includes eight wheels W on each side thereof, as shown in FIGS. 2, 3, 4 and 8. The wheels W extend into corresponding ones of the pair of tracks 36, as shown in FIGS. 4 and 8. The wheels are preferably rotatably attached to corresponding ones of the panels 40, 42 and 44.

The first, second and third panels 40, 42 and 44 basically define a door 46. When the door 46 is moved between the closed orientation shown in FIGS. 1 and 2, and the open orientation shown in FIGS. 3 and 7, the wheels W are confined to move along the tracks 36. Consequently, the movement of the door 46 is also guided by the tracks 36.

The apparatus 12 operates as follows. With the panels 40, 42 and 44 in the closed orientation (FIGS. 1 and 2) the passenger compartment 16 has space for both the front seats (not shown) and the rear seats 22. Typically, 4 or 5 passengers can be seated within the passenger compartment 16. When the door 46 (the panels 40, 42 and 44) are moved to the open orientation (FIGS. 3 and 7), the opening 28 is fully exposed with the door 46 and is stored below the floor 32 of the cargo area 18. Before, simultaneously or after moving the door 46 to the open orientation, the upper part of the rear seats 22 are lowered to the folded down $F_D$ orientation shown in FIG. 1. The now horizontal back surface of the upper part of the rear seats 22 are approximately level with the cargo floor 32. Hence, with the door 46 in the open orientation, the cargo floor 32 and the cargo area 18 is extended. Specifically, the cargo area 18 extends the length of the cargo floor 32 and into the passenger compartment 16, with the folded down back surface of the rear seats 22 being part of the cargo area 18. Thus, longer cargo can easily be carried in the cargo area 18.

Figure 5:
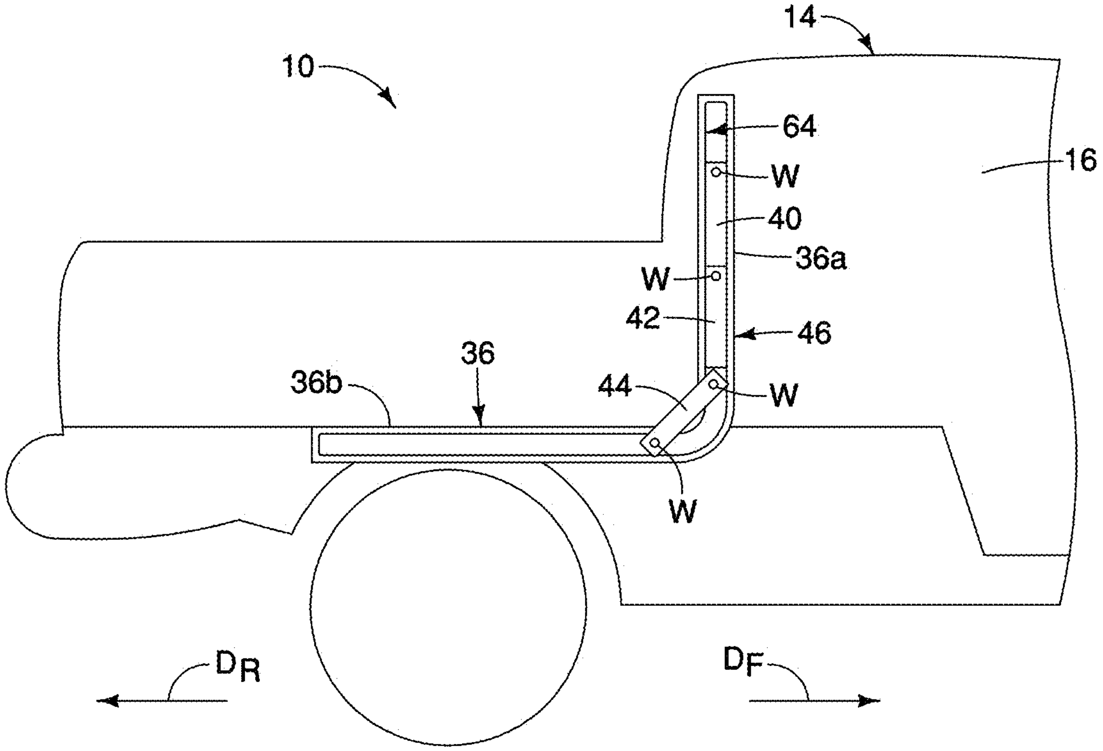
FIG. 5 is a side schematic view of the tracks and the door showing a lower panel of the door beginning to pivot and move from an upright portion of the tracks toward and into a horizontal portion of the tracks as the door begins to move from the closed orientation to the open orientation in accordance with the first embodiment.
Figure 6:
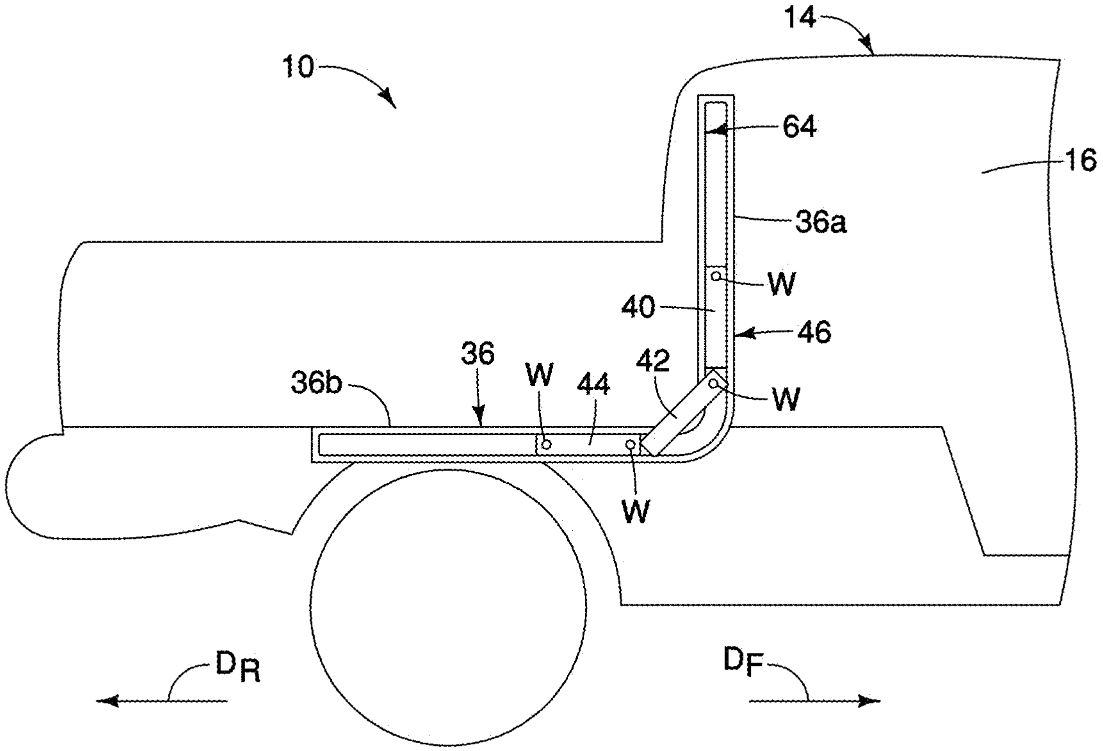
FIG. 6 is a second side schematic view of the tracks and the door showing a middle panel of the door beginning to pivot and move from the upright portion of the tracks toward and into the horizontal portion of the tracks as the door continues to move from the closed orientation to the open orientation in accordance with the first embodiment.
Figure 7:
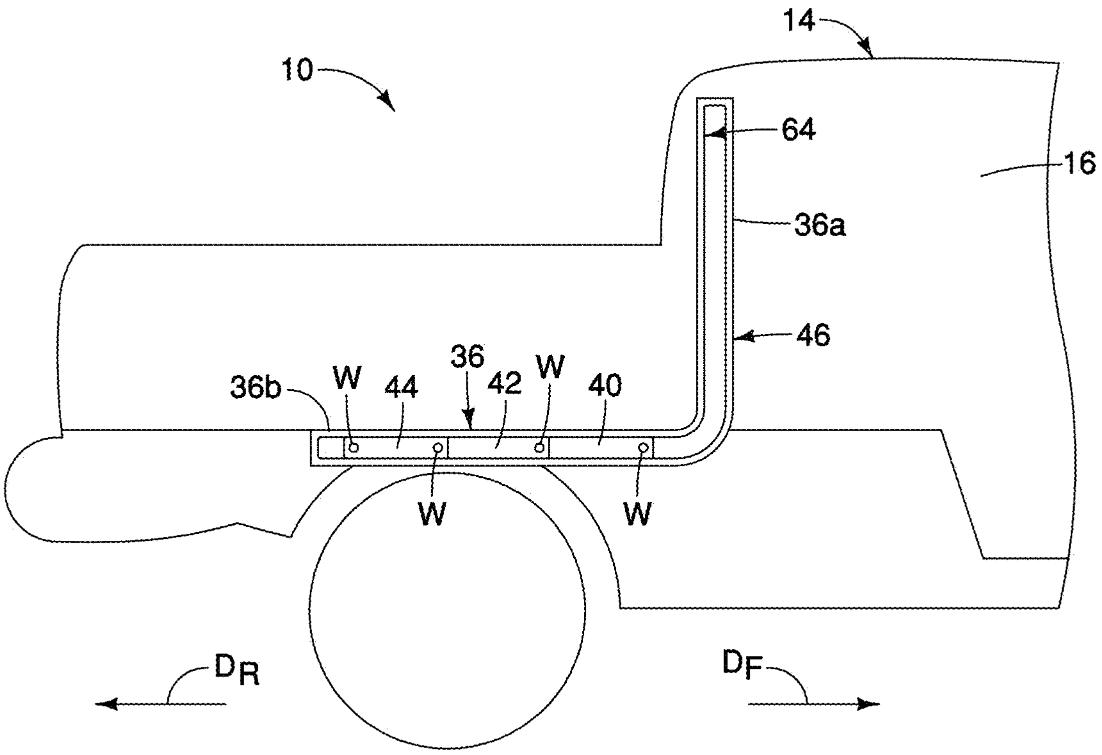
FIG. 7 is a third side schematic view of the tracks and the door showing the top, middle and lower panels of the door moved to the horizontal portion of the tracks as the door has completed movement from the closed orientation to the open orientation in accordance with the first embodiment.

The process for opening the door 46 is shown in stages in FIGS. 5, 6 and 7. Specifically, when the door 46 begins to open (FIG. 5), the wheels W being confined within the tracks 36 guide the door 46 to move initially downward along the upright portions 36*a* of the tracks 36. The lowest set of wheels W attached to the third panel 44 travel through a curve in the tracks 36 and begin to move in the rearward direction $D_R$, as shown in FIG. 5. At this point, the wheels W installed to the third panel 44 guide the third panel 44 to pivot about the hinges 50 (connecting the second panel 42 to the third panel 44) as the third panel 44 pivots completely to a horizontal orientation and continues to move in the rearward direction $D_R$, shown in FIG. 6.

As shown in FIG. 6, continued rearward movement of the third panel 44 and the door 46 toward the open orientation, causes the wheels W to guide the second panel 42 to pivot relative to the first panel 40 (and third panel 44) and move toward the horizontal orientation, that is shown in FIG. 7. Finally, the first panel 40 moves rearward and is completely horizontal as the door 46 moves to the open orientation, as shown in FIG. 7.

Closing the door 46 includes a reversal of the steps shown in FIGS. 5-7.

The door 46 can be configured for manual opening and closing. Mechanical latch mechanisms (not shown) can be installed at predetermined locations along the tracks 36 or in locations such as beneath the cargo floor 32 to retain the door 46 in the open orientation and at the upper end of the opening 28 of the passenger compartment 16 to retain the door 46 in the closed orientation. Lock mechanisms can also be installed as separate mechanisms (not shown) or as integral parts of the latch mechanisms (not shown).

Figure 9:
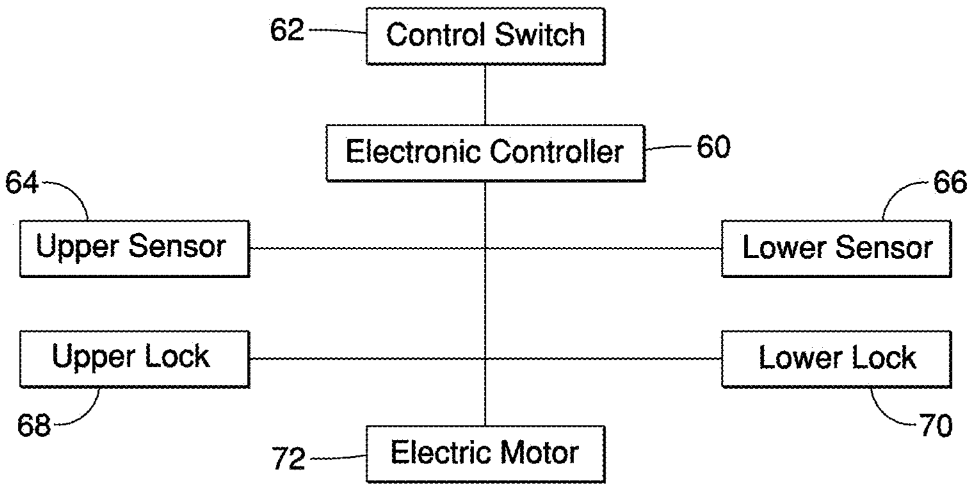
FIG. 9 is a block diagram of a control system including an electronic controller, an upper sensor that detects whether or not the door is in the closed orientation, a lower sensor that detects whether or not the door is in the open orientation, upper and lower door locks and an electric motor configured to move the door back and forth between the closed orientation and the open orientation in accordance with the first embodiment.

However, as shown in FIG. 9 in the first embodiment, the apparatus 12 includes an electronic controller 60, a control switch 62, upper sensors 64, lower sensors 66, an upper lock 68, a lower lock 70 and at least one electric motor 72. The upper sensors 64 are installed to and positioned either within the upright portions 36*a* of the tracks 36 or to the rear wall 26 adjacent to an upper end of the opening 28. The lower sensors 66 are installed to and positioned within the horizontal portions 36*b* of the tracks 36. The sensors 64 and 66 detect the location of the door 46 and provide corresponding signals to the electronic controller 60 indicating the current orientation (position) of the door 46. The upper lock 68 can include several different devices installed around the door 46 or as corresponding locations along the rear wall 26 of the passenger compartment 26 along the opening 28 that retain and lock the door 36 in the closed orientation in response to signals from the electronic controller 60. The lower lock 70 is installed to the underside of the cargo floor 32 and/or the tracks 36 to retain the door 46 in the open orientation in response to signals from the electronic controller 60. The at least one electric motor 72 is fixed to the vehicle body structure 14 and is mechanically connected to the door 46 via a cable (not shown) or gears (not shown) in order to move the door 46 between the open orientation and the closed orientation.

The electronic controller 60 is in electronic communication with each of the control switch 62, the upper sensors 64, the lower sensors 66, the upper lock 68, the lower lock 70 and the at least one electric motor 72.

The electronic controller 60 preferably includes a microcomputer with a door control program that controls the motor 72 and the locks 68 and 70. The electronic controller 60 is configured to receive signals from the sensors 64 and 66 providing information regarding the position of the door 46. The electronic controller 60 is further configured to respond to operation of the control switch 62 to move the door from the closed orientation to the open orientation and similarly from the open orientation the closed orientation. When the door 46 is moved to the open orientation, the electronic controller 60 operates the lower lock 70 to retain the door 46 in the open orientation. When the door 46 is moved to the closed orientation, the electronic controller 60 operates the upper lock 68 to retain and lock the door 46 in the closed orientation.

The electronic controller 60 also includes other conventional components such as an input interface circuit, an output interface circuit, and storage devices such as a ROM (Read Only Memory) device and a RAM (Random Access Memory) device. The microcomputer of the electronic controller 60 is programmed to control the motor 72 and the locks 68 and 70. The memory circuit stores processing results and control programs such as ones for operation of the door 46 that are run by the processor circuit.

Second Embodiment

Referring now to FIGS. 10-14, a vehicle cargo extending apparatus 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The vehicle cargo extending apparatus 112 (hereinafter the apparatus 112) includes door 146 with a single movable panel 140 that is supported by wheels W between a pair of tracks 136. The movable panel 140 is a single panel dimensioned to completely cover the opening 28 in the rear wall 26 of the passenger compartment 16 when in the closed orientation.

As shown in FIGS. 11-14, each of the tracks 136 includes an upright portion 136*a* and a horizontal portion 136*b*. Further, in addition to the motor 72, there are two second motors 72*a* at opposite sides of the tracks 136 below the upright portions 136*a* of the tracks 136.

Figure 10:
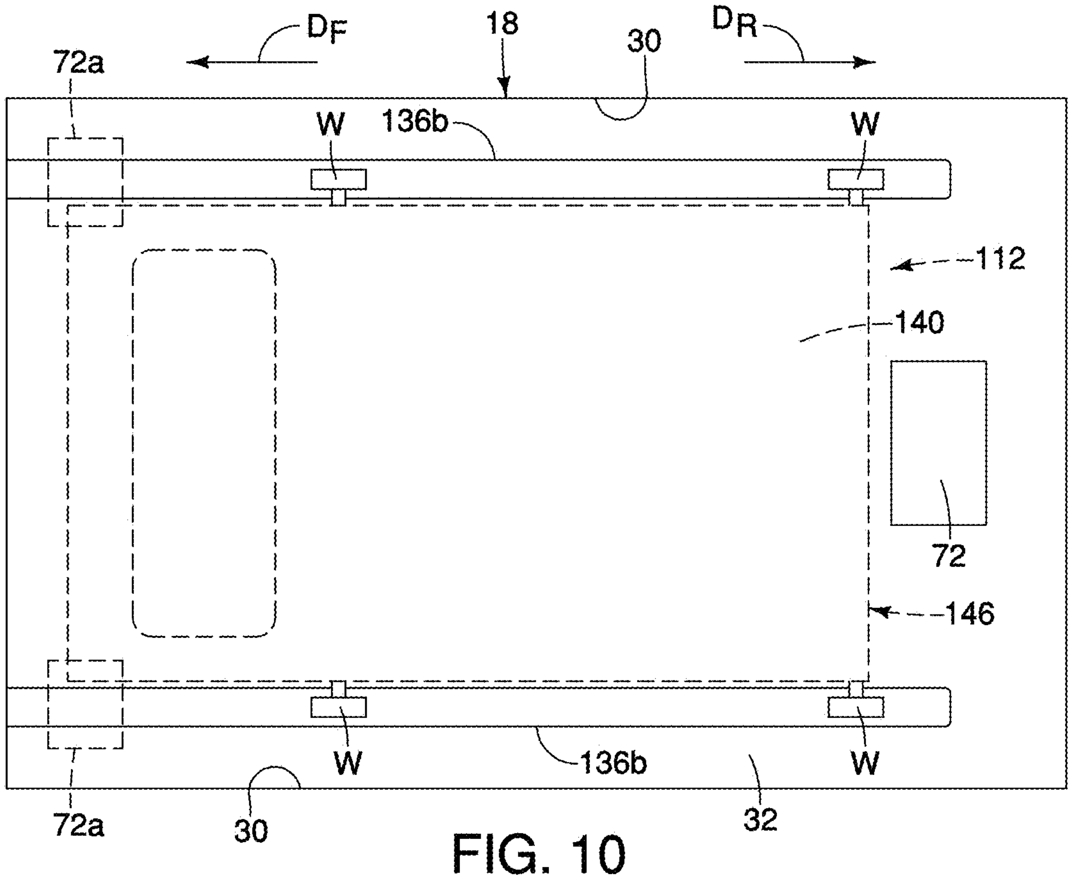
FIG. 10 is a top schematic view of a pair of tracks and a door showing a door with a single panel located between horizontal portions of the track with the door in the open orientation in accordance with a second embodiment.
Figure 11:
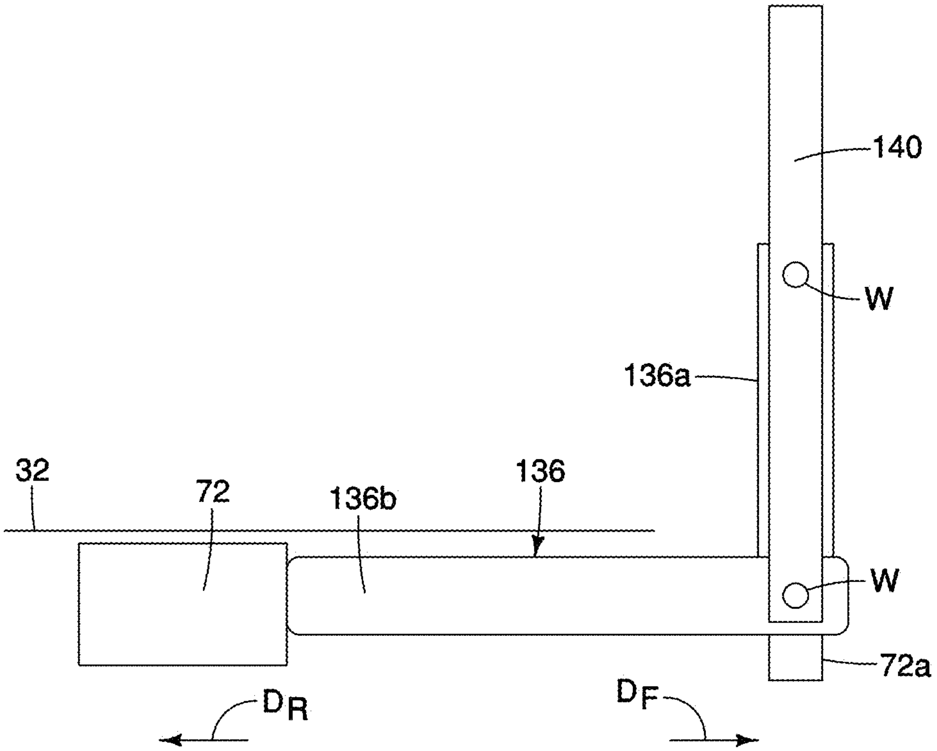
FIG. 11 is a side view of the pair of tracks and the door in the closed orientation in accordance with the second embodiment.

FIG. 10 schematically shows a horizontal portion 136*b* of the pair of tracks 136 and the single panel 140 of the door 146 located between horizontal portions 136*b* of the tracks 136 with the door 146 in the open or stowed orientation beneath the cargo floor 32. FIG. 11 shows the door 146 in the closed orientation covering the opening 28 (not shown) in the rear wall 26 of the passenger compartment 16.

Figure 12:
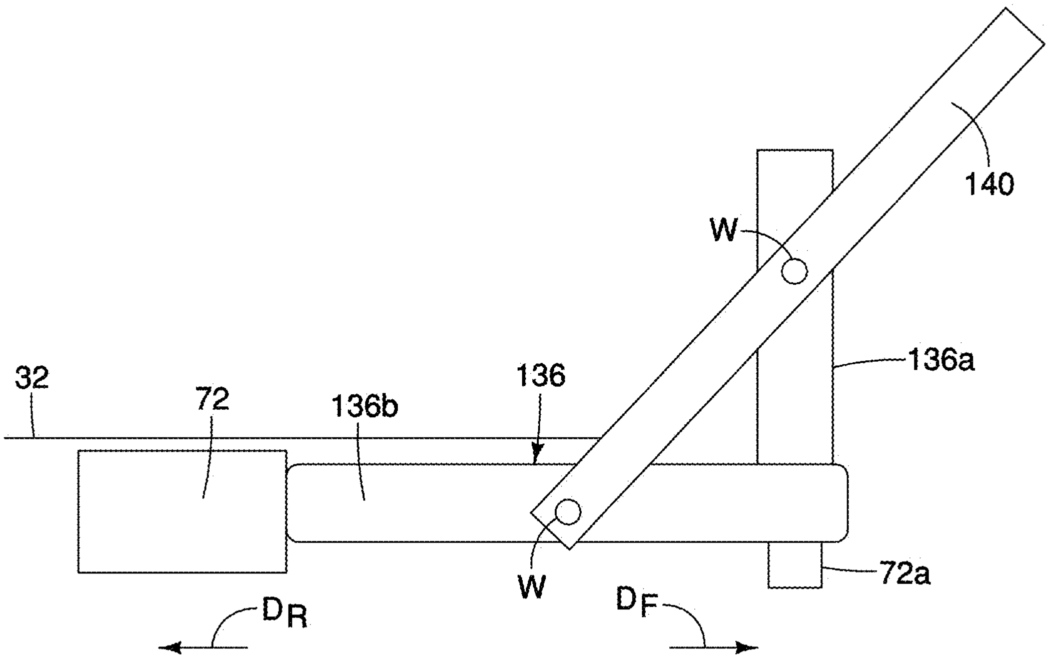
FIG. 12 is another side view of the pair of tracks and the door with the door in the process of moving from the closed orientation to the open orientation in accordance with the second embodiment.

When the door 146 is moved to the open (stowed) orientation, the motors 72 and 72*a* are operated to move the lower end of the door 146 rearward along the horizontal portions 136*b* of the tracks 136 causing the door 146 to move to an inclined orientation, as shown in FIG. 12.

Figure 13:
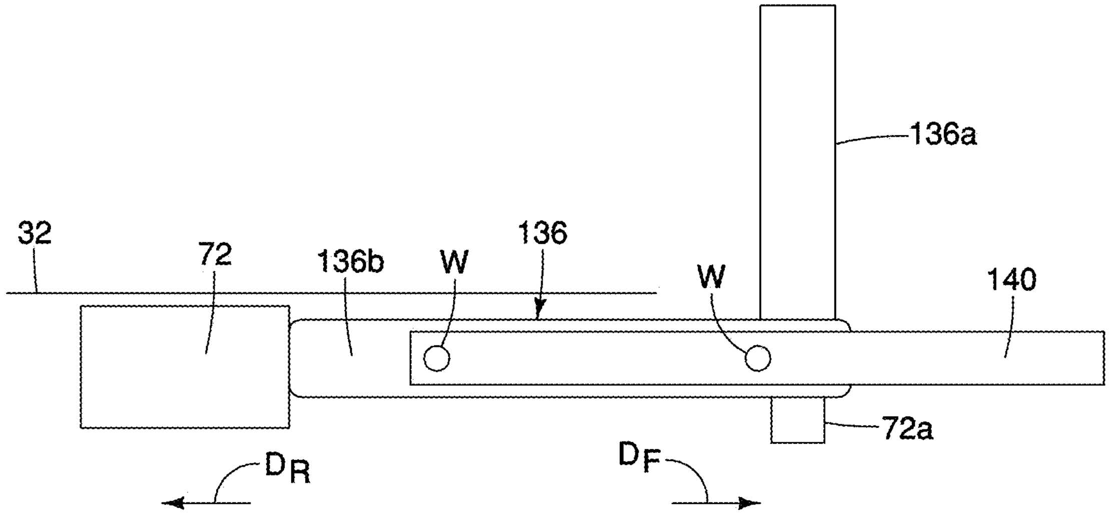
FIG. 13 is still another side view of the pair of tracks and the door with the door lying in a horizontal orientation during the process of moving from the closed orientation to the open orientation in accordance with the second embodiment.
Figure 14:
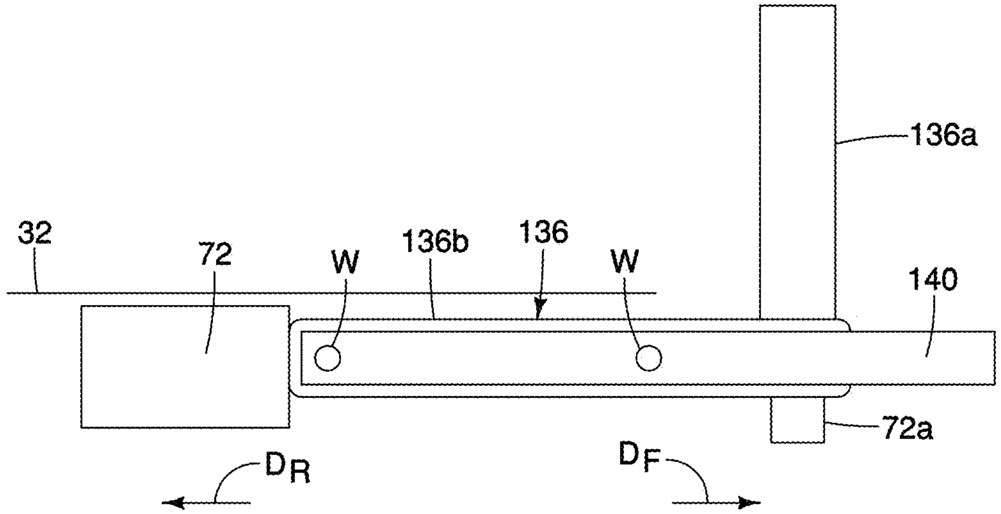
FIG. 14 is yet another side view of the pair of tracks and the door with the door moved rearward of moving from the closed orientation to the open orientation in accordance with the second embodiment.

Further movement of the door 146 brings the door 146 to a horizontal orientation during the process of moving from the closed orientation to the open orientation, as shown in FIG. 13. As shown in FIG. 14, once in the horizontal orientation, the door moved rearward to a fully stowed (open) orientation beneath the cargo floor 32. Closing of the door 146 involves a reversal of the above described door opening steps.

Third Embodiment

Referring now to FIGS. 15-20, a vehicle cargo extending apparatus 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

Figure 15:
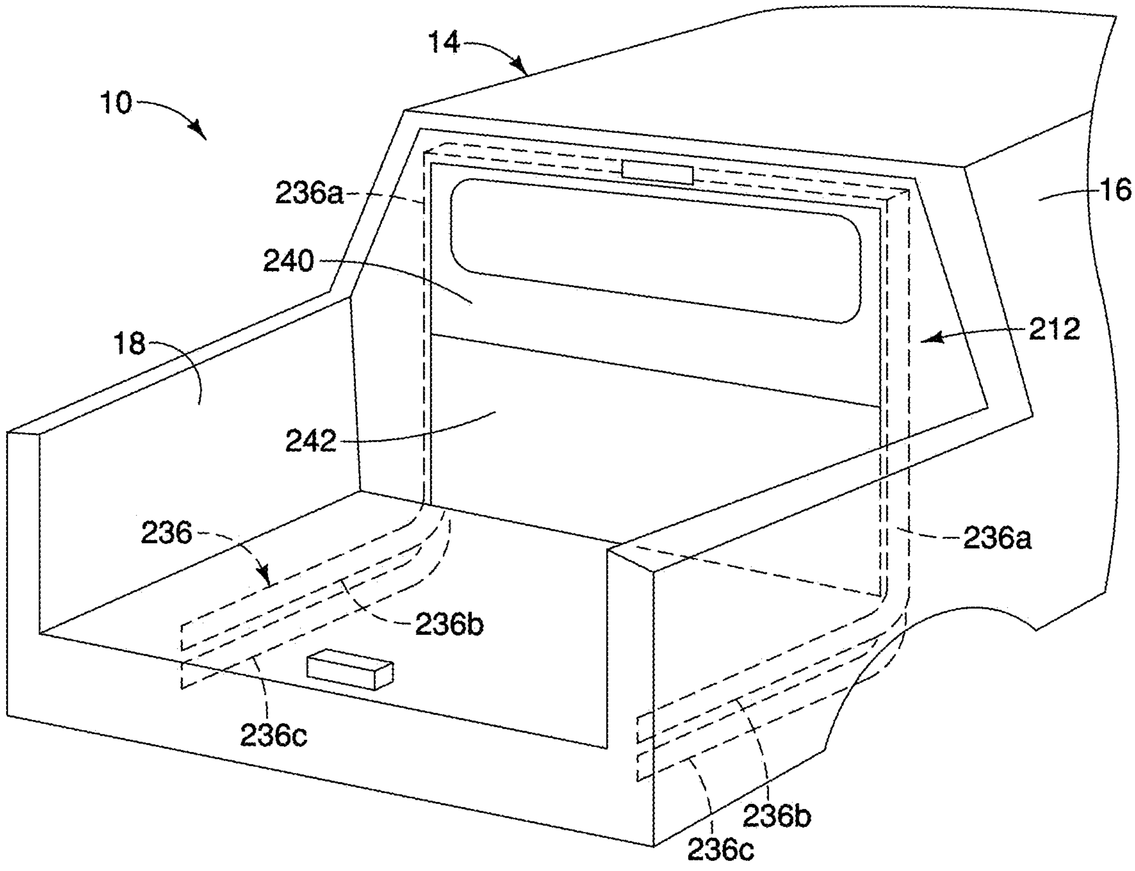
FIG. 15 is a schematic perspective view of a vehicle with a door having an upper panel (first panel) and a lower panel (second panel) in a closed orientation covering the opening in the rear wall of the passenger compartment of the vehicle in accordance with a third embodiment.

The vehicle cargo extending apparatus 212 includes a first panel 240 and a second panel 242 and a pair of tracks 236. The tracks 236 (also referred to as the track assembly 236) have an upright portion 236*a* located adjacent to the rear wall of the passenger compartment 16, as shown in FIG. 15. The tracks 236 also include a first horizontal portion 236*b* located beneath the floor 32 of the cargo area 18 and a second horizontal portion 236*c* located beneath the first horizontal track portion 236*b*. With the first and second panels 240 and 242 in the closed orientation, the first panel 240 and the second panel 242 are located in the upright portions 236*a* of the tracks 236. In the open position the first panel 240 is moved to the first horizontal portion 236*b* of the track assembly 236 and the second panel 242 is moved to the second horizontal portion 236*c* of the track assembly 236, as described below.

The tracks 236 also include a motor 72 that is mechanically connected to each of the first panel 240 (the upper panel) and the second panel 242 (the lower panel). As shown in FIGS. 17-20, the tracks 236 also include a cam mechanism 248 includes pivotal cam 249. The cam 249 includes a first recess 249*a*, a second recess 249*b* and a cam surface 249*c*. The cam mechanism 248 further includes a stepper motor (not shown) that is configured to precisely pivot the cam 249 in order to position the first recess 249*a*, the second recess 249*b* and the cam surface 249*c* at predetermined locations, as described below.

Figure 16:
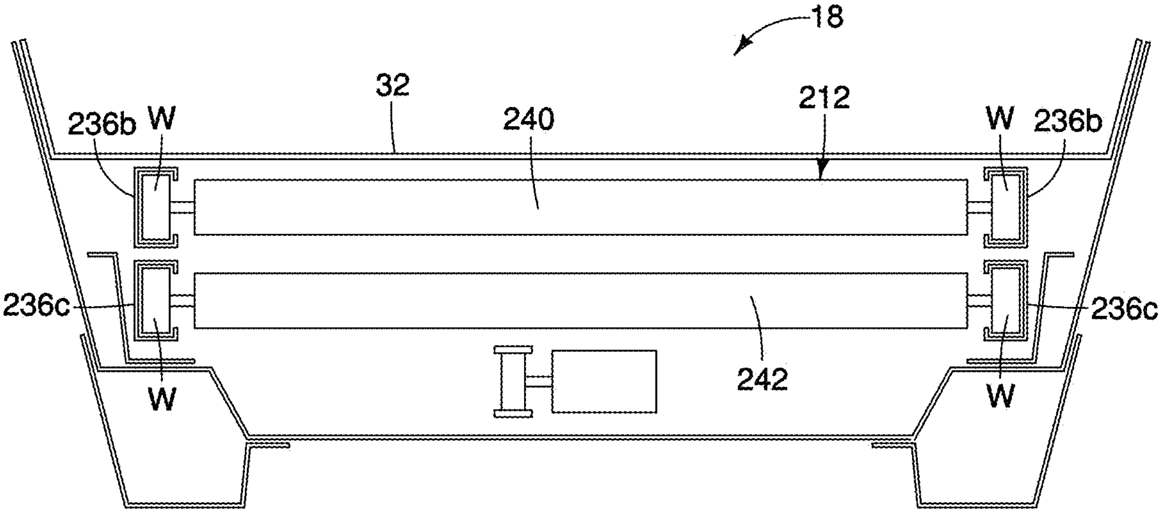
FIG. 16 is a schematic rear cross-sectional view of the unibody vehicle showing a first horizontal portion of the tracks and a second horizontal portion of the track with the upper panel being stowed in the first horizontal portion of the tracks and the lower panel of the door being stowed in the second horizontal portion of the tracks beneath the floor of the cargo area with the door in the open orientation in accordance with the third embodiment.
Figure 17:
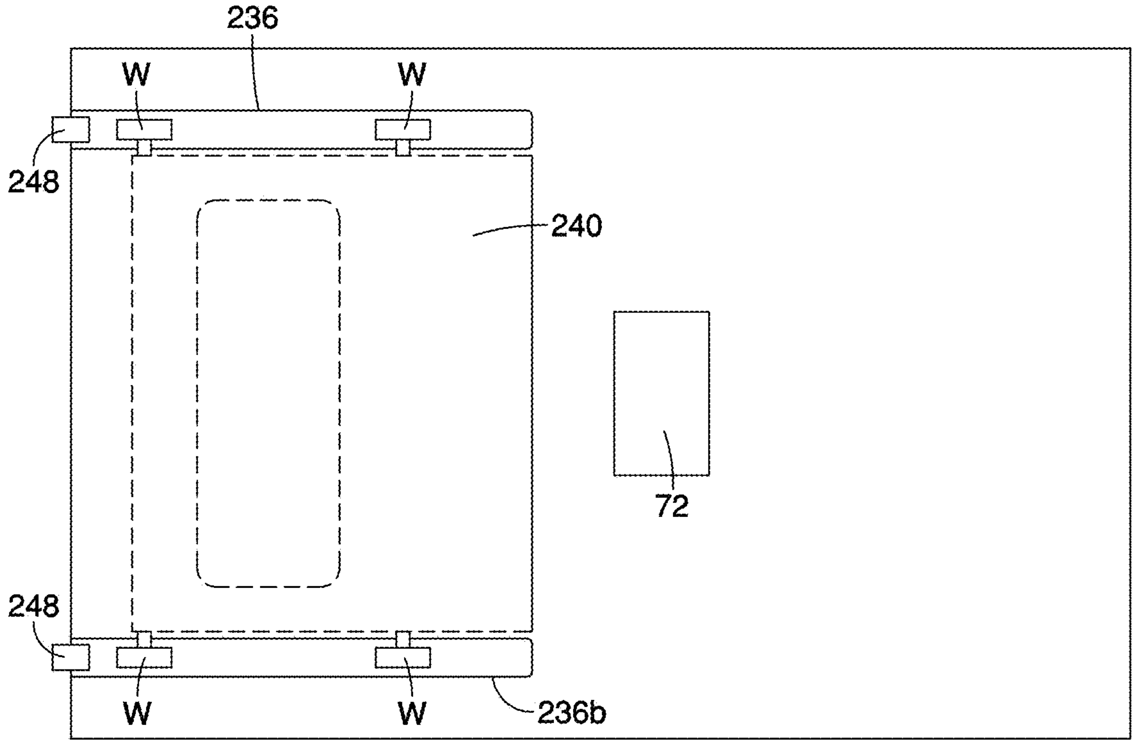
FIG. 17 is a top schematic view of the cargo area of the vehicle showing the upper panel of the door in the open (or stowed) orientation below the cargo floor in accordance with the third embodiment.
Figure 18:
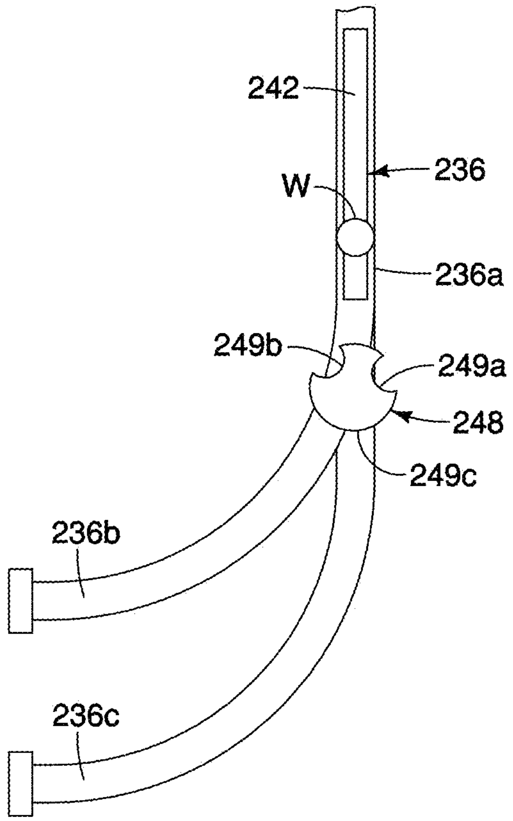
FIG. 18 is a side schematic view of one of the tracks showing the lower panel in the closed position with a cam extending into the track, the cam being configured to guide the lower panel to the lower horizontal portion of the track and guide the upper panel to the upper horizontal portion of the track when the door is moved from the closed orientation to the open (or stowed) orientation in accordance with the third embodiment.
Figure 19:
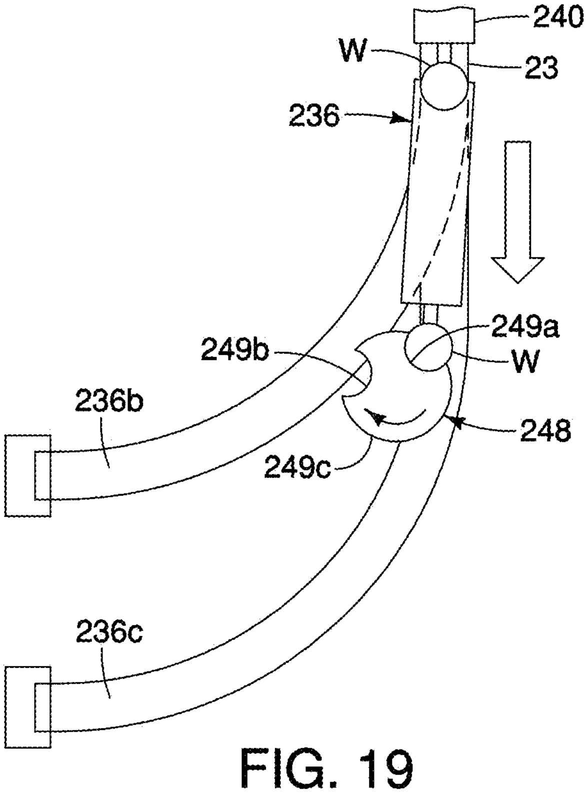
FIG. 19 is another side schematic view of one of the tracks similar to FIG. 18 showing the cam in a first position such that a lower wheel of the lower panel is moved into a first recess of the cam such that the lower panel is guided into the lower horizontal portion of the track in accordance with the third embodiment.

As shown in FIGS. 15 and 18, the upper panel 240 and the lower panel 242 are located within the upright portion 236*a* of the tracks 236 when in the closed orientation. When the door (the first and second panels 240 and 242) is moved to the open orientation as shown in FIG. 16, the lower panel 242 is moved to the second horizontal portion 236*c* of the tracks 236 and the upper panel 240 is moved to the first horizontal portion 236*b*. the As shown in FIG. 19, the process for opening the door includes pivoting the cam 248 to a first position such that a lower wheel W of the lower panel 242 is moved into a first recess 249*a* of the cam 248. The cam 248 is then further pivoted to a second position (not shown) such that the lower panel 242 is guided into the lower horizontal portion 236*a* of the track 236. Although not shown, the upper wheel W of the lower panel 242 then moves into the recess 249*b* of the cam 248, the cam 248 is further rotated to a third position shown in FIG. 29 allowing the lower panel 242 to move fully between the two lower horizontal portions 236*c* of the tracks 236.

Figure 20:
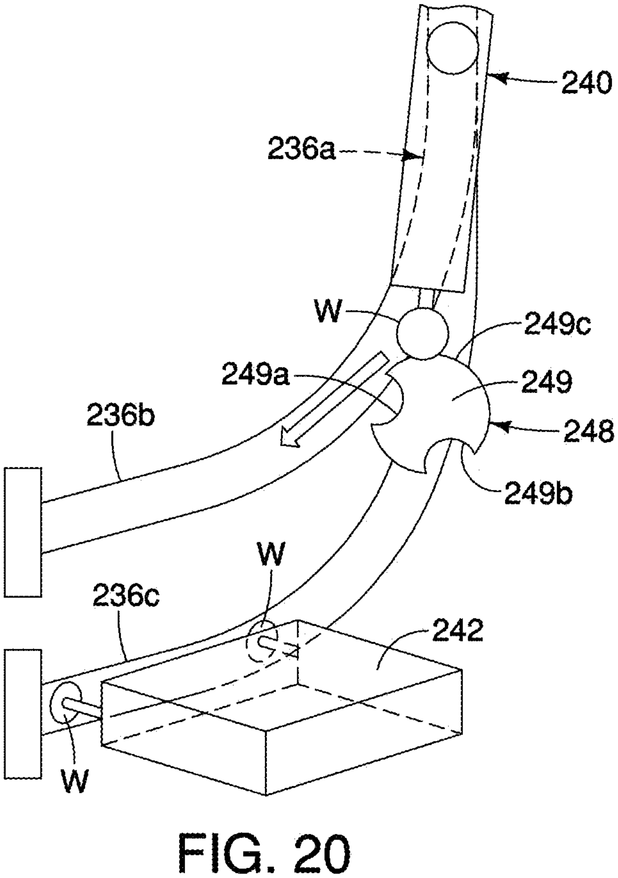
FIG. 20 is yet another side schematic view of one of the tracks similar to FIGS. 18 and 19 showing the cam rotated past a second position and to a third position such that a lower wheel of the upper panel is guided into the upper horizontal portion of the track in accordance with the third embodiment.

As shown in FIG. 20, with the lower panel 242 located in the lower horizontal portions 236*c* of the tracks 236, the upper panel 240 is moved downward until the lower wheel W of the upper panel 240 contacts the cam surface 249*c* of the cam 248 guiding the upper panel 240 into the upper horizontal portion 236*b* of the track 236.

As shown in FIG. 16, in the open orientation, the upper panel 240 is retained or stowed in the upper (first) horizontal portion 236*b* of the tracks 236 and the lower panel 242 is retained or stowed in the lower (second) horizontal portion 236*c* of the track 236.

The various parts of the unibody vehicle 19 are conventional components that are well known in the art. Since such parts are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle cargo extending apparatus. Accordingly, these terms, as utilized to describe the present invention should be interpreted relative to a vehicle equipped with the vehicle cargo extending apparatus.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle cargo extending apparatus, comprising a vehicle body structure including a passenger compartment, a cargo area, and a rear wall disposed between the passenger compartment and the cargo area, the rear wall defining an opening adjacent to the cargo area; and at least one panel movable between a closed position covering the opening and an open position exposing the opening, the at least one panel being located beneath a floor of the cargo area when in the open position, the at least one panel passing under or through the rear wall when moving between the closed position and the open position.

2. The vehicle cargo extending apparatus according to claim 1, wherein the cargo area is enlarged into the passenger compartment via the opening when the at least one panel is in the open position.

3. The vehicle cargo extending apparatus according to claim 1, wherein the at least one movable panel includes a plurality of panels connected to one another by hinges such that a first panel can pivot relative to a second panel of the plurality of panels.

4. The vehicle cargo extending apparatus according to claim 1, wherein the at least one movable panel is a single panel dimensioned to completely cover the opening in the rear wall of the passenger compartment when in the closed position.

5. The vehicle cargo extending apparatus according to claim 1, wherein the vehicle body structure includes a track assembly having an upright portion located adjacent to the rear wall of the passenger compartment and a horizontal portion located beneath the floor of the cargo area such that the track assembly supports and guides movement of the at least one panel between the closed position and the open position.

6. The vehicle cargo extending apparatus according to claim 1, wherein the upright portion of the track assembly has a first sensor located at an upper end of the upright portion and the horizontal portion includes a second sensor located at a rearward end of the horizontal portion, the first sensor being configured to send a signal to an electronic controller in response to the at least one panel being in the closed position and the second sensor being configured to send a signal to the electronic controller in response to the at least one panel being in the open position.

7. The vehicle cargo extending apparatus according to claim 6, wherein the electronic controller is part of an electric motor that is operated to move the at least one panel between the closed position and the open position.

8. The vehicle cargo extending apparatus according to claim 6, wherein the electronic controller is connected to and operates an electric motor that is operated to move the at least one panel between the closed position and the open position.

9. The vehicle cargo extending apparatus according to claim 1, wherein the passenger compartment includes at least one seat disposed forward of the rear wall such that the rear wall is disposed between the at least one seat and the cargo area.

10. A vehicle cargo extending apparatus, comprising a vehicle body structure having a passenger compartment and a cargo area, a rear wall of the passenger compartment defining an opening adjacent to the cargo area; and at least one panel movable between a closed position covering the opening and an open position exposing the opening, the at least one panel being located beneath a floor of the cargo area when in the open position, the at least one panel including a first panel and a second panel, and the vehicle body structure including a track assembly having an upright portion located adjacent to the rear wall of the passenger compartment, a first horizontal portion located beneath the floor of the cargo area, and a second horizontal portion located beneath the first horizontal track portion such that in the closed position the first panel and the second panel are located in the upright portion of the track assembly and in the open position the first panel is moved to the first horizontal portion of the track assembly and the second panel is moved to the second horizontal portion of the track assembly.

11. The vehicle cargo extending apparatus according to claim 10, further comprising a cam mechanism configured to guide the first panel to the first horizontal portion of the track assembly and guide the second panel to the second horizontal portion of the track assembly when the door is moved from the closed position to the open position.

12. The vehicle cargo extending apparatus according to claim 11, wherein the cam mechanism includes pivotal cam, and the pivotal cam includes a first recess, a second recess, and a cam surface.

13. The vehicle cargo extending apparatus according to claim 12, wherein when the at least one panel is moved from the closed position to the open position, the pivotal cam is rotated from a first position in which the first recess engages with a second wheel of the second panel to a second position in which the second wheel is guided to the second horizontal portion of the track assembly, and further to a third position in which the second recess engages with the second wheel to fully move the second panel to the second horizontal portion of the track assembly.

14. The vehicle cargo extending apparatus according to claim 13, wherein after the second panel is supported by the second portion of the track assembly, the cam surface guides a first wheel of the first panel to the first horizontal portion of the track assembly.

15. The vehicle cargo extending apparatus according to claim 11, wherein the rear wall extends in a vertical direction from an area behind lower portions of the at least one seat to an area adjacent to a roof of the passenger compartment.

16. A vehicle cargo extending apparatus, comprising a vehicle body structure including a passenger compartment and a cargo area, and a rear wall disposed between the passenger compartment and the cargo area, the rear wall defining an opening adjacent to the cargo area;

at least one panel movable between a closed position covering the opening and an open position exposing the opening;

a track assembly having an upright portion located adjacent to the rear wall of the passenger compartment and a horizontal portion located beneath the floor of the cargo area, the track assembly supporting and guiding movement of the at least one panel between the closed position and the open position, the at least one panel being supported by the upright portion of the track assembly when in the closed position and supported by the horizontal portion of the track assembly when in the open position, and a portion of the at least one panel being disposed outside the track assembly in a side view when the at least one panel is in an intermediate position between the closed position and the open position.

17. The vehicle cargo extending apparatus according to claim 16, wherein the portion of the at least one panel disposed outside the track assembly in the side view extends diagonally from the upright portion to the horizontal portion of the track assembly.

18. The vehicle cargo extending apparatus according to claim 16, wherein the at least one movable panel includes a plurality of panels connected to one another by hinges such that a first panel can pivot relative to a second panel of the plurality of panels, and the portion of the at least one panel disposed outside the track assembly in the side view is a portion of each of the plurality of panels in succession during an intermediate stage as the at least one panel is moved from the closed position to the open position.

19. The vehicle cargo extending apparatus according to claim 16, wherein the at least one movable panel is a single panel dimensioned to completely cover the opening in the rear wall of the passenger compartment when in the closed position, and when the single panel is in the intermediate position between the closed position and the open position, the portion of the single panel disposed outside the track assembly in the side view includes a first portion that extends diagonally rearward from the upright portion to the horizontal portion of the track assembly and a second portion that extends diagonally forward from the upright portion of the track assembly toward the passenger compartment.

20. The vehicle cargo extending apparatus according to claim 16, wherein the track assembly includes a pair of tracks spaced apart from each other in a transverse direction of vehicle body structure, each of the pair of tracks having the upright portion and the horizontal portion, the at least one panel includes at least four wheels that support the at least one panel with respect to the track assembly, two or more of the at least four wheels being confined within one of the pair of tracks and two or more of the at least four wheels being confined within the other of the pair of tracks, the portion of the at least one panel disposed outside the track assembly in the side view is disposed between two of the two or more wheels confined within the one of the pair of tracks and between two of the two or more wheels confined within the other of the pair of tracks.

* * * * *